Nov. 21, 1967 H. P. DENGLER ETAL 3,354,000
ELECTROCHEMICAL CELL
Filed Nov. 8, 1963

THOMAS A. REITER
HERBERT P. DENGLER
INVENTORS

BY
*Henry Berk*

PATENT ATTORNEY

United States Patent Office 3,354,000
Patented Nov. 21, 1967

3,354,000
ELECTROCHEMICAL CELL
Herbert P. Dengler, Fair Haven, and Thomas A. Reiter, Chatham, N.J., assignors to Esso Research and Engineering Company, a corporation of Delaware
Filed Nov. 8, 1963, Ser. No. 322,284
12 Claims. (Cl. 136—86)

This invention relates to improvements in electrochemical cells. In particular, this invention relates to an improved electrochemical cell which is designed to provide optimum areas of contact per unit volume between an aqueous electrolyte and a known aqueous fluid reactant upon an electron conductive surface. More particularly, this invention relates to electrochemical cells wherein the parallel electrodes of the cell are spirally arranged.

One of the problems faced in the construction of an electrochemical cell utilizing parallel electrodes is the duct work required for admitting the oxidant fuel into the cell and removing the reaction products from the cell. As the cell becomes more and more compact and the spacings within the cell are of necessity decreased, the problem of providing ducts for ingress and egress of reactants into and from the cell becomes more acute.

It has now been found that the amount of duct work required to furnish fuel and oxidant to the cell can be greatly reduced if the electrodes of the cell are composed of a flexible or jointed material and are then simultaneously wrapped about two members positioned at the center of the electrode's length and perpendicular to the upper and lower edges of the electrode.

The basic components of the instant wrapped electrode are similar to the components of the prior art cells, i.e., the instant cells include a fuel passage, a flexible or jointed fuel electrode, an electrolyte space, a flexible or jointed oxidant electrode and an oxidant passage. The fuel and oxidant passage and electrolyte space are obtained by using nonconductive spacers such as loosely woven plastic mesh and porous membranes. The electrodes can be wire screens, thin perforated metal foil or metal coated membranes. In the case of metal coated membranes, the membrane can be used as the electrolyte space and the metal coatings upon such membrane will function as the anode and cathode respectively. Suitable catalysts may be pressed into or bound to the electrodes. In the case of thin foil electrodes or metal coated electrodes, an electroconductive current collector may be used in juxtaposition with the electrodes to minimize power losses because of poor electrode conductivity. The cell in the present case would comprise an electrolyte space having an anode juxtaposed to one surface, a cathode juxtaposed to the opposite surface, a fuel tube in juxtaposition with the anode, positioned at approximately the center of the anode's length and perpendicular to the upper and lower edges of said anode. An oxidant tube will be juxtaposed to the cathode in parallel relationship with the fuel intake tube. Means to form a fuel passage and oxidant passage, each being approximately one-half the length of the electrodes, are juxtaposed one against the anode, one against the cathode, extending from the tubes to opposite ends of the electrode fuel passage membrane. This total structure is then simultaneously wrapped about the two tubes either in a clockwise or counterclockwise direction.

The horizontal cross section of the wrapped cell can be circular, square, hexagonal, or any other desired shape. If the cross-section area is to be hexagonal, for example, it would be preferred to use hexagonal fuel and oxidant tubes rather than cylindrical tubes which would be preferred if a cell having a circular cross section were desired. Alternatively, the shape of the cell can be regulated by utilizing jointed component members which make up the cell. The particular cross-sectional shape of a cell will be dictated by the use for which the cell is to be employed. That is to say, the efficiency of the cell is not effected by its particular shape.

The fuel and oxidant tubes can be composed either of conductive or nonconductive materials which are either perforated or slit so that:

(a) the fuel and oxidant can be admitted into the respective passages in order that these reactants may intimately come into contact with the electrolyte-electrode interface,
(b) the oxidation and reduction products can escape from the cell, or
(c) one of the reactants can be introduced through its respective tube and the other tube can be used to remove the reaction products of the other reactant, thus allowing the cell to be operated with what is, in effect, a countercurrent flow of the two reactants.

After the parts of the cell are simultaneously wrapped about the fuel and oxidant tubes, the assembly can then be placed in a suitably shaped container with axial slits for the oxidant and fuel to be either admitted into or removed from the cell. Said cylindrical container could have one end sealed. After the cell has been inserted into the container, the upper portion of the container may or may not be sealed at the discretion of the operator. If the upper portion is not sealed, this will allow the reaction products, such as water and carbon dioxide, to escape by rising directly from the electrolyte and electrode interfaces. If the upper portion is sealed, then the reaction products are removed from the cell either through the axial slits, or the central tubes. The container and fuel and oxidant tubes can either be composed of a conductive or nonconductive material. If the tubes consist of a conductive material, they can function as the primary electrical terminals of the cell. If the container is composed of a conductive material, it can function as one of the electrical terminals in lieu of one of the tubes. If the use to which the cell is to be put does not admit the use of either the container or the fuel or oxidant tubes as primary electrical terminals, such terminals can be placed elsewhere on the cell. In a preferred embodiment of this invention, the container would be of a nonconductive material and the fuel and oxidant tubes would be conductive materials and function as the electrical terminals of the cell. In a further modification the container would be of a nonconductive material having electrically conductive strips in the container connecting the electrodes of like polarity and the fuel and oxidant tubes would be electrically conductive materials. The strips on the container and fuel and oxidant tubes would serve as the electrical terminals to the cell. By using such a system the current path would be reduced thereby reducing the voltage loss due to the resistance of the electrode.

The invention will be more easily understood by referring to the accompanying drawing.

Figure 1:
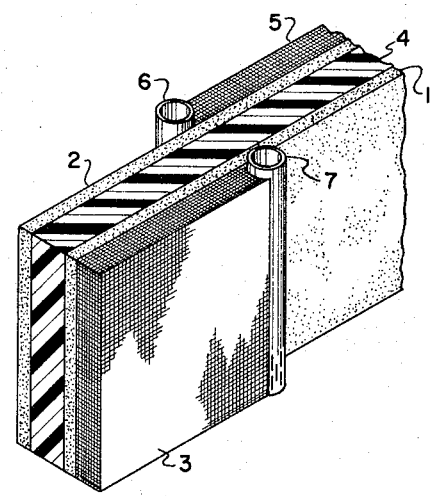
FIGURE 1 represents a schematic view of the instantly claimed electrode before being wound about the fuel and oxidant tubes.

FIGURE 1 shows the assembly of the cell. The assembly comprises a loosely woven mesh spacer 3, a fuel tube 7 having axial slits in its lower portion, a metallic anode 1, a porous membrane 4, a metallic cathode 2, a loosely woven mesh spacer 5 and an oxidant tube 6 having axial slits in its lower portion. In the drawing, anode 1 and cathode 2 are metal coatings on opposite surfaces of membrane 4. However, metal screen anodes and cathodes placed in contact with the membrane can be used in place of the metal coatings. In assembling the cell, tube 7 is placed approximately at the longitudinal center of the electrode membrane combination. Mesh spacer means 3 approximately half the length of the electrode membrane combination is placed in contact with the anode and extends from the tube 7 to one end of the electrode membrane combination. Tube 6 is placed in contact with the cathode of the electrode membrane combination opposite and parallel to tube 7. Mesh spacer means 5 being approximately half the length of the electrode membrane combination is placed in contact with the cathode and extends from the tube 6 to the end of the membrane electrode combination opposite the end to which the spacer means 3 was extended. It would be obvious to one skilled in the art to substitute jointed members for the flexible members depicted in the drawing. After the components of the assembly are put together as set forth in the drawing, the entire combination is then simultaneously spirally wound about both of tubes 6 and 7.

Figure 2:
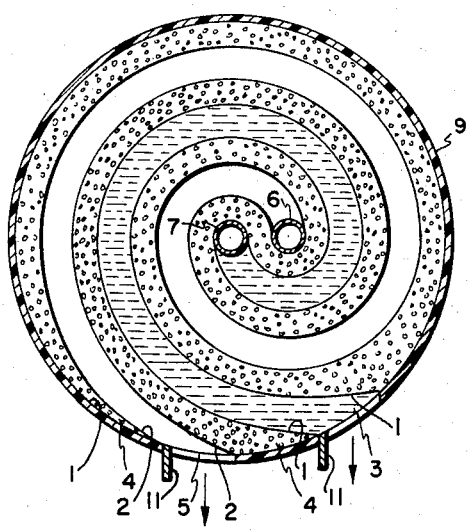
FIGURE 2 is a horizontal cross-sectional view of a spirally wound cell.

FIGURE 2 is a cross-sectional view of a cell comprised of flexible elements spirally wound about oxidant tube 6 and fuel tube 7. It is, of course, obvious to those skilled in the art that if jointed members rather than flexible members are used, the cross-sectional shape of the cell would assume a geometric shape other than the circular cross section set forth in the drawing. There is set forth in FIGURE 2 oxidant tube 6, fuel tube 7, cathode 2, anode 1, spacer means 3, 4 and 5 and electrically conductive strips 11. In the operation of the cell, spacer means 4 will be saturated with an aqueous electrolyte such as aqueous sulfuric and phosphoric acids and aqueous potassium and sodium hydroxide. Anode 1 and cathode 2 are depicted as being metal coatings on the surface of spacer means 4 which is in the embodiments set forth in the drawing a porous membrane. Fuel spacer 3 and oxidant spacer 5 are loosely woven mesh material preferably plastic material. The function of spacer means 3 and 5 is to provide channels in the cell for the passage of fuel and oxidant. The spirally wound cell is shown inserted into the container 9 which is adapted to retain the spirally wound cell. In the preferred embodiment of operation, oxidant enters downwardly through tube 6 and escapes through the axial slits into space 5 where it contacts the cathode. The fuel is admitted into the cell through tube 7 and exits therefrom through axial slits into space 3 wherein the fuel contacts the anode. The tubes 6 and 7 in the drawing are metal coated plastic tubes and function as the electrical terminals of the cell.

Figure 3:
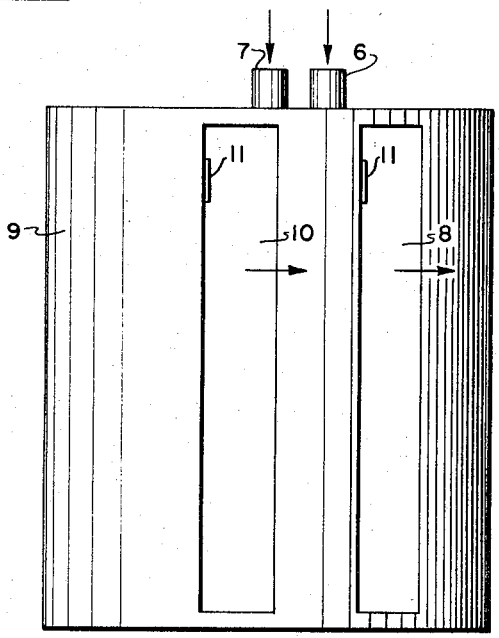
FIGURE 3 is a side view of the cell container having a spirally wound cell therein.

FIGURE 3 is a side view of a cell container 9 having a cell therein. The container has two slits in the side thereof through which the exhaust gases can escape. The slits will correspond to the ends of the fuel spacer 3 and oxidant spacer 5 on the periphery of the wound cell so that the gases can travel through the respective fuel and oxidant spacings and exit from the cell through the exhaust slits in the side of the container. In the figure, slit 10 is for the exhaust of the oxidant and slit 8 is the fuel exhaust. Also shown in the drawing is fuel inlet tube 7 and oxidant inlet tube 6. The container in the embodiment of the invention depicted in the drawing is a cylinder having one end closed and having electrically conductive strips 11. However, the upper part can be closed if desired. In the preferred embodiment, the container will be cylindrical. However, a cross-sectional shape of the container can be of any convenient geometric shape.

In order to more fully describe this invention, the following examples are presented for the purpose of illustration only and should not be construed as limitations upon the scope of this invention as set forth in the appended claims.

*Example 1*

A spiraled cell of this invention is made by using a membrane having both its surfaces gold coated with a catalyst impressed thereon. The membrane will act as the electrolyte space and the gold surfaces of said membrane will function as the anode and cathode of the cell. Gold coated plastic tubes having perforations therein are used as a fuel and oxidant intake. The fuel intake is placed in juxtaposition with the anode at about the longitudinal middle of said anode. The oxidant intake is placed in parallel relationship with the fuel intake but in juxtaposition with the cathode. Finely woven plastic mesh material is placed in juxtaposition with the anode and extending from the fuel intake to one end of the anode. Finely woven plastic mesh material which will function as the oxidant spacing means is placed in juxtaposition with the cathode and extends from the oxidant intake to the end of the cathode remote from the end to which the fuel spacing means was extended. The assembly is then spirally wound in a counterclockwise position about both the fuel intake and oxidant intake tubing. The spirally wound cell is then inserted in a plastic cylindrical container and rotated so that the end of the fuel and air passages of the spirally wound cell correspond to the axial slits in the container. The membrane is saturated with 30 wt. percent sulfuric acid. The fuel intake acts as one terminal of the cell and the air intake acts as the oppositely polarized electrical terminal.

*Example 2*

A cell may be constructed as in Example 1 but in order to effect more efficient electroconductivity a platinum wire screen is placed in contact with each of said anode and cathode and then the intake tubes are placed in juxtaposition with such wire screens. The wire screens will act as current collectors in order to increase the efficiency of the electroconductivity.

*Example 3*

A porous membrane is to be used as the electrolyte spacer, a platinum wire screen functions as the anode and a gold coated wire screen will function as the cathode. Each of said screens are pressed one against each space of said membrane. A platinum coated plastic tube having perforations therein is used as the fuel intake. A gold coated plastic tube having perforations therein is used as the oxidant intake. Said oxidant intake is placed in juxtaposition with the cathode at about the longitudinal center of said cathode. Said fuel intake is placed in parallel relationship with the oxidant intake but in juxtaposition with the anode. Finely woven mesh material to function as the fuel spacer means and oxidant spacer means are positioned in juxtaposition with the anode and cathode as set forth in Example 1. The cell assembly is then spirally wound about the fuel and air intakes in a counterclockwise position. The spirally wound assembly is then inserted into a cylindrical container and the membrane electrolyte spacer is saturated with the aqueous electrolyte.

What is claimed is:

1. An electrochemical cell which comprises in combination an electrode assembly, an apertured fuel tube, an apertured oxidant tube, a fuel spacer and an oxidant spacer, said electrode assembly comprising an anode, a cathode and an electrolyte spacer, said fuel tube situated at the longitudinal center in contact with said anode, said oxidant tube situated opposite said fuel tube in contact with said anode, said fuel spacer extending from said fuel to one end of said electrode assembly, said oxidant spacer extending from said oxidant tube to the end of said electrode assembly opposite the end to which the fuel intake was extended, said electrode assembly, said fuel spacer and said oxidant spacer wound about both of said fuel tube and said oxidant tube.

2. An electrochemical cell as in claim 1 wherein said electrolyte spacer is a porous membrane having its two opposite surfaces metal coated, one metal coating being the anode and the other metal coating being the cathode.

3. An electrochemical cell as in claim 1 wherein said electrode assembly, said fuel spacer and said oxidant spacer are spirally wound about said fuel and oxidant tubes.

4. An electrochemical cell as in claim 1 wherein said electrolyte spacer is a porous membrane, said anode is a platinum screen and said cathode is a gold screen.

5. An electrochemical cell pack comprising in combination an electrode assembly, an apertured fuel tube, an apertured oxidant tube, a fuel spacer, an oxidant spacer, and a cell container adapted to retain said electrode assembly, fuel and oxidant spacers, said electrode assembly comprising an anode, a cathode and an electrolyte spacer, said fuel tube situated at the center of and in contact with said anode, said oxidant tube situated in contact with the cathode parallel to said fuel tube, said fuel spacer extending from said fuel tube to one end of said electrode assembly, said oxidant spacer extending from said oxidant tube to the end of said electrode assembly opposite the end to which the fuel spacer was extended, said electrode assembly, said fuel spacer and said oxidant spacer being wound about said fuel tube and said oxidant tube and retained in said cell container.

6. An electrochemical cell pack as in claim 5 wherein said cell container comprises an electrically nonconductive material and said fuel tube and oxidant tube are of an electrically conductive material, whereby said oxidant and fuel tubes function as the electrical terminal of the cell.

7. An electrochemical cell pack as in claim 5 wherein one of said fuel and oxidant tubes and said cell container are composed of electrically conductive material.

8. An electrochemical cell pack as in claim 5 wherein said fuel and oxidant tubes are composed of electrically conductive material and said cell container is composed of an electrically nonconductive material and has electrically conductive strips thereon which contact the anode and cathode of said electrode assembly, said strips, fuel tube and oxidant tube function as the electrical terminals of the cell.

9. A method of making a compact electrochemical cell pack which comprises the steps of:
(a) contacting one surface of a porous membrane with a flexible anode,
(b) contacting the opposite surface of said porous membrane with a flexible cathode,
(c) placing an apertured fuel tube in contact with said anode at the center of the anode perpendicular to the length of the anode,
(d) placing an apertured oxidant tube in contact with said anode at the center of the cathode perpendicular to the length of the cathode, (e) extending a first flexible porous spacer element from said fuel tube to one end of said membrane in contact with the anode,
(f) extending a second flexible porous spacer element from the oxidant tube in a direction opposite to that of the first spacer element to the other end of said membrane in contact with the cathode,
(g) simultaneously winding said membrane, anode, cathode, first spacer and second spacer about both the the fuel tube, and oxidant tube,
(h) inserting said membrane, anode, cathode, first spacer and second spacer wound about both of said fuel tube and oxidant tube, into a container adapted to retain same.

10. An electrochemical cell pack comprising in combination an electrode assembly, an apertured fuel tube, an apertured oxidant tube, a fuel spacer, an oxidant spacer and a cell container adapted to retain said electrode assembly, fuel and oxidant spacers and tubes, said electrode assembly comprising a platinum screen anode, a platinum screen cathode and a porous membrane electrolyte spacer, said fuel tube being a hollow metal coated plastic tube situated at the center of and in contact with said anode, said oxidant tube comprising a metal coated plastic tube situated in contact with the cathode parallel to said fuel tube, a loosely woven plastic mesh fuel spacer extending from said fuel tube to one end of said electrode assembly, a loosely woven plastic oxidant spacer extending from said oxidant tube to the end of said electrode assembly, opposite the end to which the fuel spacer was extended, said electrode assembly, fuel spacer and oxidant spacer being wound about said fuel and oxidant tubes and retained in a plastic cell container.

11. An electrochemical cell pack as claimed in claim 5 wherein said cell container is closed at one end.

12. An electrochemical cell pack comprising in combination an electrode assembly, an apertured fuel tube, an apertured oxidant tube, a fuel spacer, an oxidant spacer, and a longitudinally apertured, fully enclosed, cell container adapted to retain said electrode assembly, fuel and oxidant spacers, said electrode assembly comprising an anode, a cathode and an electrolyte spacer, said fuel tube situated at the center of and in contact with said anode, said oxidant tube situated in contact with the cathode parallel to said fuel tube, said fuel spacer extending from said fuel tube to one end of said electrode assembly, said oxidant spacer extending from said oxidant tube to the end of said electrode assembly opposite the end to which the fuel spacer is extended, said electrode assembly, said fuel spacer and said oxidant spacer being wound about said fuel tube and said oxidant tube and retained in said cell container.

References Cited
UNITED STATES PATENTS

| | | | |
|---|---|---|---|
| 2,275,281 | 3/1942 | Berl | 136—86 |
| 2,933,547 | 4/1960 | Grubb | 136—100 |
| 3,012,086 | 12/1961 | Vahldieck | 136—86 |
| 3,234,050 | 2/1966 | Beltzer et al. | 136—86 |
| 3,248,267 | 4/1966 | Langer et al. | 136—86 |
| 3,259,524 | 7/1966 | Fay et al. | 136—86 |

ALLEN B. CURTIS, *Primary Examiner.*

WINSTON, A. DOUGLAS, *Examiner.*